(12) United States Patent
Essawi et al.

(10) Patent No.: US 8,904,519 B2
(45) Date of Patent: Dec. 2, 2014

(54) SHARED REGISTRATION SYSTEM MULTI-FACTOR AUTHENTICATION

(75) Inventors: Tarik Essawi, Leesburg, VA (US); James Gould, Leesburg, VA (US); Pat Kane, Ashburn, VA (US); Dan Schonfeld, Reston, VA (US); Joe Waldron, Herndon, VA (US); Scott Hollenbeck, Reston, VA (US)

(73) Assignee: Verisign, Inc., Reston, VA (US)

( * ) Notice: Subject to any disclaimer, the term of this patent is extended or adjusted under 35 U.S.C. 154(b) by 670 days.

(21) Appl. No.: 12/487,567

(22) Filed: Jun. 18, 2009

(65) Prior Publication Data

US 2010/0325723 A1 Dec. 23, 2010

(51) Int. Cl.
- G06F 7/04 (2006.01)
- G06F 12/14 (2006.01)
- G06F 13/00 (2006.01)
- G06F 17/30 (2006.01)
- H04L 9/32 (2006.01)
- G06F 21/62 (2013.01)

(52) U.S. Cl.
CPC ............ H04L 9/3226 (2013.01); H04L 9/3234 (2013.01); H04L 2209/56 (2013.01); G06F 21/62 (2013.01); H04L 2209/38 (2013.01)
USPC .............. 726/20; 709/203; 709/223; 709/217

(58) Field of Classification Search
CPC ....... H04L 63/20; H04W 12/08; G06F 21/32; G06F 21/604; G06F 21/62
USPC .......................... 726/7, 20; 709/203, 217, 223
See application file for complete search history.

(56) References Cited

U.S. PATENT DOCUMENTS

| | | | |
|---|---|---|---|
| 7,188,138 B1 | 3/2007 | Schneider | |
| 7,299,299 B2 * | 11/2007 | Hollenbeck et al. | 709/245 |
| 7,565,402 B2 | 7/2009 | Schneider | |
| 7,760,882 B2 * | 7/2010 | Tidwell et al. | 380/270 |
| 7,945,948 B2 * | 5/2011 | Ueda et al. | 726/5 |
| 8,037,168 B2 | 10/2011 | Schneider | |
| 8,224,994 B1 | 7/2012 | Schneider | |
| RE43,690 E | 9/2012 | Schneider et al. | |
| RE44,207 E | 5/2013 | Schneider | |
| 8,458,161 B2 | 6/2013 | Schneider | |
| 8,612,565 B2 | 12/2013 | Schneider | |
| 8,635,340 B1 | 1/2014 | Schneider et al. | |

(Continued)

OTHER PUBLICATIONS http://epp-rtk.sourceforge.net/epp-howto.html, Sep. 28, 2001.*

(Continued)

*Primary Examiner* — Saleh Najjar
*Assistant Examiner* — Feliciano Mejia
(74) *Attorney, Agent, or Firm* — MH2 Technology Law Group, LLP

(57) ABSTRACT

A system and method for establishing a chain of trust from a registrant to a registry. A registrant request to a registrar to change a domain name record includes at least one registrant factor, such as a one time password. The registrar can formulate an extended EPP command that includes the factor to effectuate the change and send it to a registry. The registry can verify the at least one factor using at least one validation server. If the factor is successfully verified, the EPP can be processed by the registry. If the factor is not verified, the EPP command may not be processed and an error message may be generated and sent to the registrar.

16 Claims, 5 Drawing Sheets

(56) References Cited

U.S. PATENT DOCUMENTS

| | | | |
|---|---|---|---|
| 2001/0049787 A1* | 12/2001 | Morikawa et al. | 713/156 |
| 2002/0002678 A1* | 1/2002 | Chow et al. | 713/169 |
| 2002/0046189 A1* | 4/2002 | Morita et al. | 705/67 |
| 2002/0087860 A1* | 7/2002 | William Kravitz | 713/168 |
| 2002/0159601 A1* | 10/2002 | Bushmitch et al. | 380/277 |
| 2003/0041091 A1* | 2/2003 | Cheline et al. | 709/200 |
| 2004/0059952 A1* | 3/2004 | Newport et al. | 713/202 |
| 2005/0102354 A1* | 5/2005 | Hollenbeck et al. | 709/203 |
| 2006/0064588 A1* | 3/2006 | Tidwell et al. | 713/169 |
| 2006/0218278 A1* | 9/2006 | Uyama et al. | 709/226 |
| 2006/0218289 A1* | 9/2006 | Assad | 709/229 |
| 2008/0016233 A1 | 1/2008 | Schneider | |
| 2008/0059607 A1 | 3/2008 | Schneider | |
| 2009/0067409 A1* | 3/2009 | Ku et al. | 370/352 |
| 2010/0318858 A1* | 12/2010 | Essawi et al. | 714/49 |

OTHER PUBLICATIONS

Aug. 6, 2010 International Search Report and Written Opinion for related international application PCT/US10/38517.

* cited by examiner

SHARED REGISTRATION SYSTEM MULTI-FACTOR AUTHENTICATION

BACKGROUND OF THE INVENTION

A domain name registration system in which registry services are shared among multiple independent registrars is a Shared Registration System (SRS.) The SRS presently implemented on the Internet utilizes the Extensible Provisioning Protocol (EPP), a text/XML protocol that permits multiple service providers (such as registrars) to perform object provisioning operations using a shared central object, such as a registry. EPP includes extension mechanisms that provide for the modification and/or addition of implementation-specific features and other object management capabilities.

Security is needed for a SRS to protect the integrity of domain name registrations. For example, security measures are implemented to ensure that only accredited registrars can add, delete or otherwise modify a domain name record at a registry. Such security measures can include requirements that the registry authenticate a registrar before the registry processes EPP commands. The registry can authenticate the registrar by verifying the registrar's digital certificate, requiring and verifying a registrar password, verifying that the registrar's communications originate from an IP address (or address range) known to be associated with the registrar, etc.

Security measures can also be implemented for communications between a registrant and the registrar. This is important to ensure that modifications requested for a domain name properly originate with an authorized party, such as the registrant itself. Such security measures can include requiring and verifying a registrant password at the registrar, verifying the registrant's digital certificate, etc.

Another security measure is Auth Info, which includes a secondary password used to authorize domain name transfers. When a registrant wishes to initiate a transfer, the registrant provides its Auth Info password to the gaining registrar, who uses it to initiate the transfer request. The use of the secondary Auth Info password can prevent the unauthorized transfer of a domain name.

Known security measures are not entirely effective against all threats. For example, an unauthorized entity that has stolen the actual registrant's credentials can pose as the registrant and improperly add, delete or modify a domain name record in the registrant's name. Likewise, a registrar (or an entity posing as a registrar that has the registrar's credentials) can improperly add, delete or modify a registrant's domain name record. What is needed is a system that can ensure verify the actual registrant's authorization to make changes to a domain name record.

SUMMARY OF THE INVENTION

The present invention relates generally to systems for managing domain name records maintained at a registry. More specifically, the present invention relates to methods and systems for providing a chain of trust from a registrant to a registry using multi-factor authentication. This chain of trust can help to ensure that any change to a domain name record maintained at the registry has been properly requested and authorized. The methods and techniques can be implemented using any suitable authentication factor or factors, include One Time Passwords (OTP) implemented in hardware or software, biometrics, hardware- or software-based PKI technology such as smart cards, SMS, automated voice call verification, device identifiers, etc. The factor can be used in accordance with embodiments of the present invention to authenticate and authorize EPP transactions for provisioning objects, such as domains, hosts, email forwarding, defensive registrations, etc.

According to an embodiment of the present invention, a registrant can generate one or more factors (e.g., via a registrant token having an identifier that can generate OTPs, via a biometric scan of the registrant's fingerprint, iris or retina, via a registrant digital certificate on a smart card, etc.) The registrant can logon to a registrar web site and submit a request to add, delete or modify (change) a domain name registration that is maintained at a registry. For example, the registrant can submit a request to register the domain name test.com (if it is available); submit a request to change the name servers for one of its already-registered domain name; transfer the domain name, etc. In accordance with an embodiment of the present invention, the registrant can submit to the registrar one or more factors, such as an OTP generated by the registrant's token, registrant biometric data, a registrant certificate, such as on a smart card, etc., to the registrar, optionally along with the registrant's token identifier. Once the registrar has verified and accepted the registrant's credentials and, in some cases, payment, the registrar can formulate a request to a registry to effectuate the requested changes. For example, the registrar can formulate and send to a registry application server a request containing an extended EPP CREATE command that contains the factor (e.g., the OTP, biometric and/or PKI data) provided by the registrant. The registry application server can send the factor to a validation server for verification. If the factor is successfully verified, the validation server can send a message confirming the verification to the registry application server, which can then process the EPP command and create the domain name record for the domain requested by the registrant. In this way, the registry zone file is only changed after verifying that the request for the change is authentic and authorized.

These and other embodiments of the invention are described in more detail in conjunction with the text below and attached figures.

DETAILED DESCRIPTION OF EMBODIMENTS OF THE INVENTION

In accordance with an embodiment of the present invention, information (a "factor") from the registrant that can be used to authorize and/or authenticate a registrant request to change (add, delete, modify) a domain name record is bound to a message indicating the change from a registrar to a registry that maintains the record. The factor can be verified before the registry processes the change message from the registrar. If the factor is not verified, the change request embodied in the message can be rejected by the registry. This can prevent an unauthorized entity from having changes improperly implemented to a domain name record. It can also prevent a registrar from changing a domain name record without the authorization of the registrant or another entity authorized to caused such changes.

Figure 1:
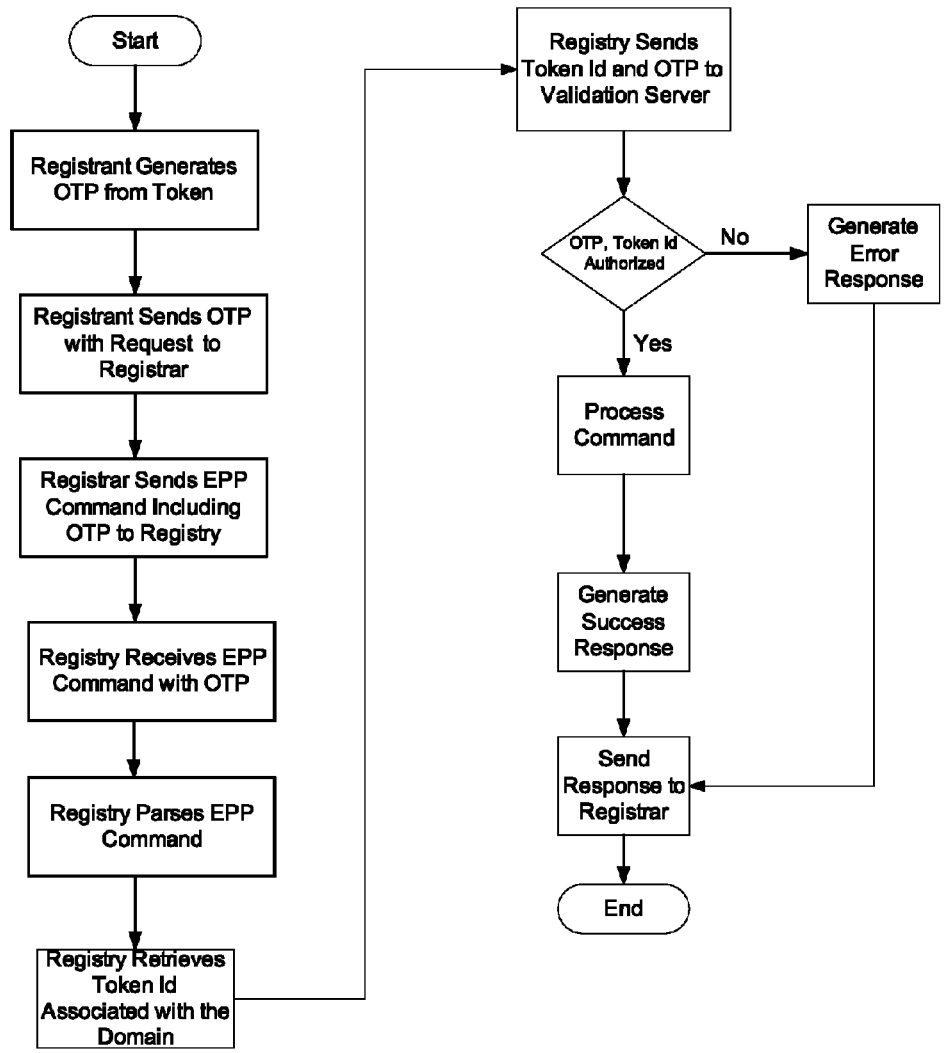
FIG. 1 is a flow chart showing the method in accordance with an embodiment of the present invention.

The method in accordance with an embodiment of the invention is shown in FIG. 1. In this embodiment, the factor is a One Time Password (OTP) that can be generated by a token in the possession of the registrant. The token can be a hardware token, or the OTP generator can be embodied in software executing on any suitable platform, such as on a cell phone of the registrant.

The registrant can logon to the registrar web site, e.g., by using a logon identifier and a password, i.e., a secret shared between the registrant and the registrar. Upon successfully verifying the registrant's logon credentials, the registrar can receive and accept a request from the registrant to change one of the registrant's domain name records. For example, the registrar may submit a request to change the name servers associated with a domain name that the registrant has already registered. Alternatively, the registrant may submit a request for that a new domain name be registered, and provide the registrar with the information necessary to do so. Also, the registrant can ask the registrar to delete one of the registrant's domain name registrations. Along with the request, the registrant can send its OTP and its token identifier.

The registrar can then formulate the appropriate EPP commands to send to the registry to cause the requested changes to be made to the registry's domain name registration record. Along with the EPP commands, the registrar can send the OTP received from the registrant.

Upon receiving this communication from the registrar, the registry can send the OTP to a validation server. The validation server can be operated by the registry, or by a trusted third party, such as VeriSign. The validation server can verify whether the OTP was in fact generated by the token. The validation server can send the result of its verification to the registry. If the OTP was successfully verified, then the registry can be assured the request originated from the registrant of the domain name and/or that the registry is properly authorized to effectuate the requested changes. A message reporting the success or failure of the processing of the change request message can be sent by the registry to the registrar. If the OTP is not successfully verified, then the registry can generate an error message and send it to the registrar, and not effectuate the requested changes.

In accordance with an embodiment of the present invention, EPP CREATE and UPDATE commands can support the passing of a OTP and optionally a token identifier. If the token identifier is included in the command, the OTP will be validated and, if the validation is successful, then the token identifier can be bound to the provisioning object, as well as (optionally) any child object that is part of the EPP create or update command.

The following example shows an EPP extension that can be used to bind the token to a domain:
Add OTP Data to Non-OTP Domain

```
<command>
<update>
<domain:update
    xmlns:domain="urn:ietf:params:xml:ns:domain-1.0"
    xsi:schemaLocation="urn:ietf:params:xml:ns:domain-
    1.0 domain-1.0.xsd">
<domain:name>test.com</domain:name>
<domain:add/>
<domain:rem/>
<domain:chg/>
```

-continued

```
</domain:update>
</update>
<extension>
<otpAuth:create
    xmlns:otpAuth="http://www.verisign-
    grs.com/epp/otpAuth-1.0"
    xsi:schemaLocation="http://www.verisign-
    grs.com/epp/otpAuth-1.0 otpAuth-1.0.xsd">
<otpAuth:id>1234</otpAuth:id>
<otpAuth:otp>abc123</otpAuth:otp>
<otpAuth:type>VIP</otpAuth:type>
</otpAuth:create>
</extension>
</command>
</epp>
```

The above code shows an extension (between <extension> and </extension>) to the EPP UPDATE command. The extension specifies the xmlns namespace (http://www.verisign-grs.com/epp/otpAuth-1.0); the token identifier ("1234", above); and the OTP itself ("abc123").

The following example shows an extended EPP UPDATE command in accordance with embodiments of the present invention. In this example, only the OTP is sent to the registry and the token is retrieved by looking up the token identifier bound to the domain object.

Domain Update with OTP Authorization

```
<?xml version="1.0" encoding="UTF-8" standalone="no"?>
<epp xmlns="urn:ietf:params:xml:ns:epp-1.0"
    xmlns:xsi="http://www.w3.org/2001/XMLSchema-instance"
    xsi:schemaLocation="urn:ietf:params:xml:ns:epp-1.0 epp-
    1.0.xsd">
<command>
<update>
<domain:update
    xmlns:domain="urn:ietf:params:xml:ns:domain-1.0"
    xsi:schemaLocation="urn:ietf:params:xml:ns:domain-
    1.0 domain-1.0.xsd">
<domain:name>test.com</domain:name>
<domain:add>
<domain:ns>
<domain:hostObj>ns1.test.com</domain:hostObj>
</domain:ns>
<domain:status s="clientDeleteProhibited"/>
</domain:add>
<domain:rem/>
<domain:chg/>
</domain:update>
</update>
<extension>
<otpAuth:auth
    xmlns:otpAuth="http://www.verisign-
    grs.com/epp/otpAuth-1.0"
    xsi:schemaLocation="http://www.verisign-
    grs.com/epp/otpAuth-1.0 otpAuth-1.0.xsd">
<otpAuth:otp>abc123</otpAuth:otp>
</otpAuth:auth>
</extension>
</command>
</epp>
```

The code above shows an EPP UPDATE command to add a registration for the domain "test.com." The added domain name record is to include the hostname "ns1.test.com" and the record is to be locked ("clientDeleteProhibited"). The extension (between the <extension> and </extension> tags) includes namespace information and the OTP itself, "abc123".

The following example shows an extended EPP DELETE command in accordance with an embodiment of the present invention:

Domain Delete with OTP Authorization

```
<?xml version="1.0" encoding="UTF-8" standalone="no"?>
<epp
   xmlns="urn:ietf:params:xml:ns:epp-1.0"
   xmlns:xsi="http://www.w3.org/2001/XMLSchema-instance"
   xsi:schemaLocation="urn:ietf:params:xml:ns:epp-1.0 epp-
   1.0.xsd">
   <command>
   <delete>
   <domain:delete
   xmlns:domain="urn:ietf:params:xml:ns:domain-1.0"
       xsi:schemaLocation="urn:ietf:params:xml:ns:domain-1.0
       domain-1.0.xsd">
       <domain:name>test.com</domain:name>
       </domain:delete>
       </delete>
       <extension>
       <otpAuth:auth
          xmlns:otpAuth="http://www.verisign-
          grs.com/epp/otpAuth-1.0"
          xsi:schemaLocation="http://www.verisign-
          grs.com/epp/otpAuth-1.0 otpAuth-1.0.xsd">
          <otpAuth:otp>abc123</otpAuth:otp>
          <otpAuth:auth>
    </extension>
    <clTRID>ABC-12345</clTRID>
    </command>
    </epp>
```

The above code example shows an OTP ("abc123") included in an extended EPP DELETE command.

The following example shows an extended EPP TRANSFER command in accordance with an embodiment of the present invention.

Domain Transfer Request with OTP Authorization

```
<epp
   xmlns="urn:ietf:params:xml:ns:epp-1.0"
   xmlns:xsi="http://www.w3.org/2001/XMLschema-instance"
   xsi:schemaLocation="urn:ietf:params:xml:ns:epp-1.0 epp-
   1.0.xsd">
   <command>
   <transfer op="request">
   <domain:transfer
   xmlns:domain="urn:ietf:params:xml:ns:domain-1.0"
   xsi:schemaLocation="urn:ietf:params:xml:ns:domain-1.0
   domain-1.0.xsd">
   <domain:name>test.com</domain:name>
   <domain:period unit="y">1</domain:period>
   <domain:authInfo>
   <domain:pw>corepw</domain:pw>
   </domain:authInfo>
   </domain:transfer>
   </transfer>
   <extension>
   <otpAuth:auth
      xmlns:otpAuth="http://www.verisign-
      grs.com/epp/otpAuth-1.0"
      xsi:schemaLocation="http://www.verisign-
      grs.com/epp/otpAuth-1.0 otpAuth-1.0.xsd">
      <otpAuth:otp>abc123</otpAuth:otp>
      </otpAuth:auth>
      </extension>
      </command>
      </epp>
```

The above code includes OTP "abc123" in the EPP TRANSFER command extension.

In some cases, it may be necessary to for the registrar to update provisioning objects with extended security in accordance with an embodiment of the present invention. For example, when a domain is auto-renewed, but the registrar is unable to obtain payment from the registrant. In such cases, the registrar may want to delete the domain (to avoid an unreimbursed registry fee to the registrar) or remove it from the zone file until payment from the existing registrant or a new registrant can be obtained.

Embodiments of the present invention can accommodate such situations by including a registrar OTP in an EPP command. If the registrar OTP is provided with the EPP command, then the domain can be updated without having to validate the registrant OTP.

When a large number of domains have to be modified as part of an automated process, the EPP command can include an OTP override attribute. When this attribute is set to "override", the domain can be updated without validating either the registrar or the registrant OTP. The EPP command can also include an "override reason" attribute that can be used to explain why the domain records are to be updated without an OTP. Override occurrences can be tracked by the registry and reported to the registrar.

If a token is lost, the registrar can contact the token provider, such as VeriSign, and cause a new token to be bound to a provisioning object that was secured by the lost token. The registrar can validate that the new token is going to the correct registrant by verifying the registrant's identity.

In accordance with an embodiment of the invention, a registrar can replace a lost token by sending an EPP UPDATE command that contains the old token identifier, an OTP from the lost token and the identifier of the new token. If the OTP from the lost token is successfully validated, then the new token identifier can be bound to the provisioning object being updated.

Embodiments of the present invention can operate with multiple vendors to validate multiple factors. The vendor should meet security requirements of SRS and provide an integration mechanism. The validation servers in an embodiment can include validation servers from the registry and from third parties.

Figure 2:
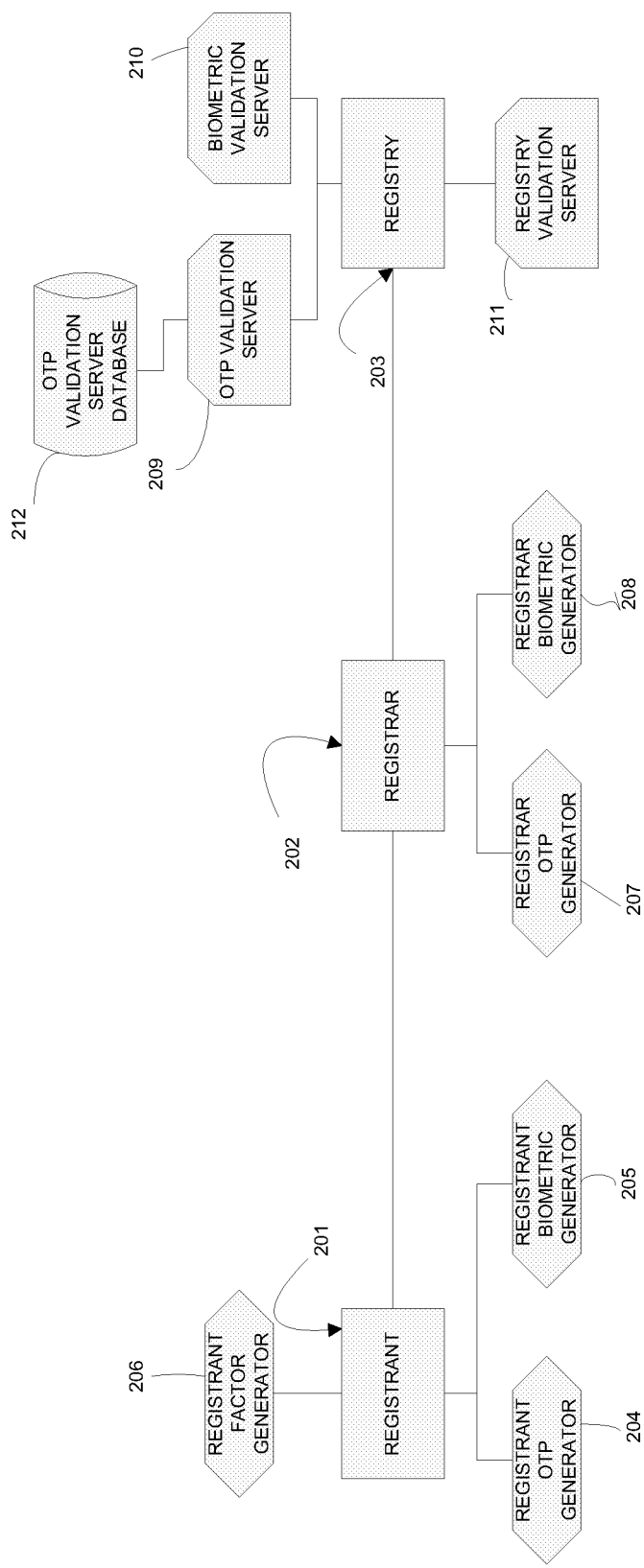
FIG. 2 shows a system in accordance with an embodiment of the present invention.

A system in accordance with the present invention is shown in FIG. 2. Registrant 201 is in communication with registrar 202, which in turn is in communication with registry 203. Registrant 201 has access to one or more registrant factor generators 204-206. In this embodiment, registrant factor generator 204 is a registrant token that can generate registrant OTPs. Registrant factor generator 205 is a biometric reader, such as a fingerprint reader or an iris scanner. Any number of factor generators may be used by registrant 201. Registrar 202 is coupled to registrar factor generators 207-208. Registrar factor generator 207 is a registrar token that can generate registrar OTPs. Any number of factor generators may be used by registrar. Registry 203 is in communication with validation servers 209-211. Validation server 209 is an OTP validation server that is coupled to OTP validation server database 212. The validation server database 212 can store records that correlate a given token identifier with the shared secret stored in the token that is used to generate the OTPs. The other validation servers 210 and 211 can by used to verify other kinds of factors (e.g., biometrics, certificates, etc.) provided by registrants and/or registrars. A validation server may be operated by a trusted third party, such as VeriSign, or be operated by the registry itself, e.g., as shown as registry validation server 211.

The registrant 210 can be a user interacting with a registrant computer that is in communication with the registrar 202 through a network, such as a Local Area Network (LAN), a Wide Area Network (WAN), the Internet, etc. The OTP generators 204 and 207 can be a Unified Authentication token provided by VeriSign that can support OATH-compliant, time-based, LDAP, and ODBC for OTP generation, or any other suitable OTP generator. The biometric generators 205 and 208 can be a retina scanner, iris scanner, fingerprint reader, voice recognition software, or any other suitable biometric factor generator.

Registrar 202 can be a registrar server, and can include a gateway, a registrar database and other components known in the art to comprise a registrar. Registry 203 can include a gateway server, a registry application server and a registry database. OTP validation server 209 can be a VeriSign Unified Authentication validation server, or any other validation server that can verify the OTPs submitted by the registrant 201 and the registrar 202. Biometric validation server 210 can be a server capable of verifying a biometric (e.g., retina scan, fingerprint, etc.) submitted by a registrant 201 or registrar 202.

Figure 3:
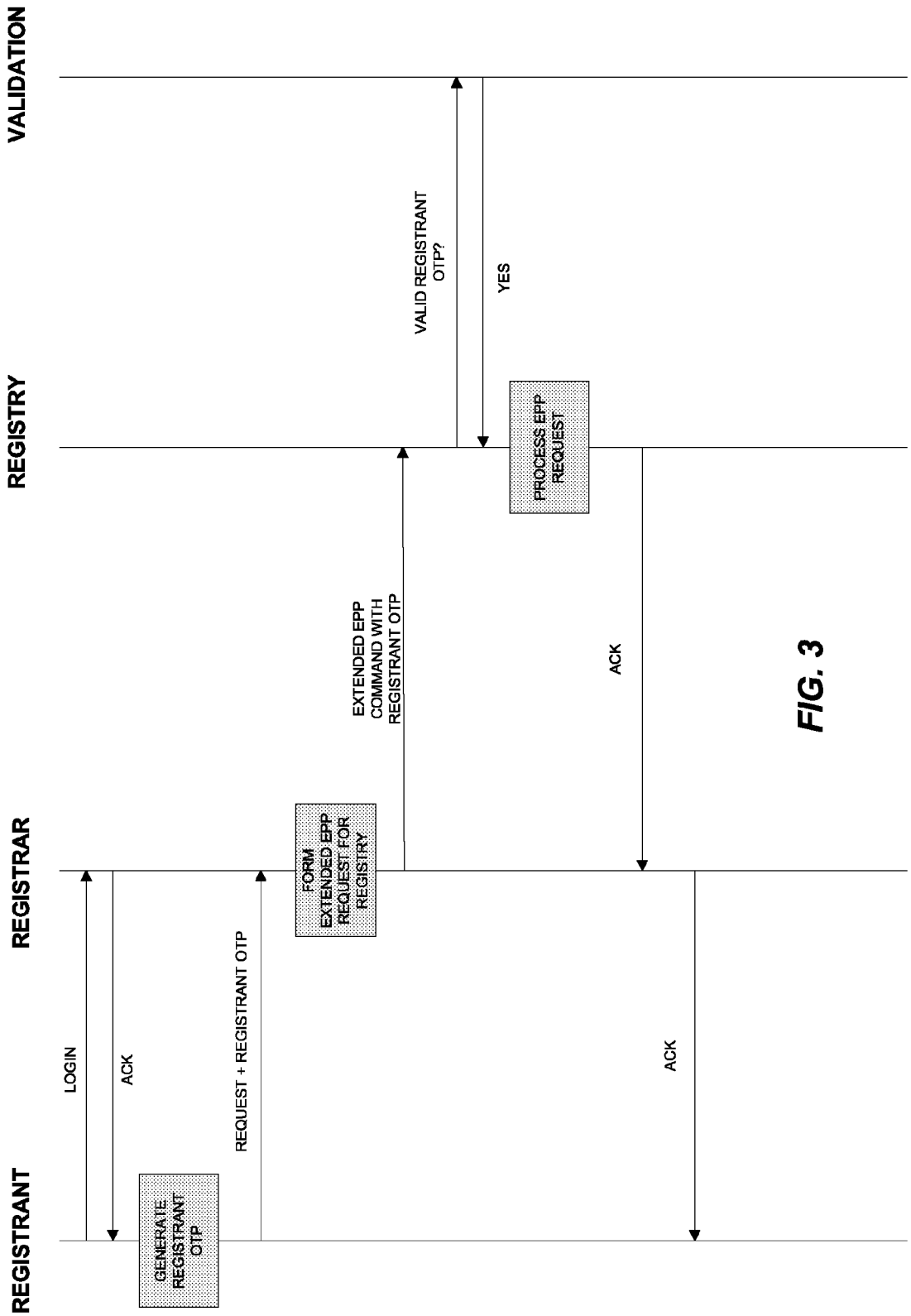
FIG. 3 shows a message flow in accordance with an embodiment of the present invention.

FIG. 3 shows a message flow in accordance with an embodiment of the present invention in which a OTP is used to authenticate and authorize a request to change a domain name record that originates with a registrant. The registrant logs in to the registrar web server and generates a registrant OTP. The registrant OTP is sent along with a request to change the domain name registration record to the registrar. The registrar formulates a request that includes an extended EPP command that includes the registrant OTP to effectuate the requested change for transmission to the registry. When the registry receives the extended EPP command from the registrar, it first verifies the registrant's OTP by sending it to a validation server. If the validation server verifies the OTP, it sends a message to that effect back to the registry. The registry can them make the change set forth in the extended EPP command and send and acknowledgment back to the registrar, which can in turn information the registrant that the requested change was made successfully. If the validation server fails to verify the OTP, it can send a message to that effect to the registry, which does not effectuate the extended EPP command, and sends an error message back to the registrar.

Figure 4:
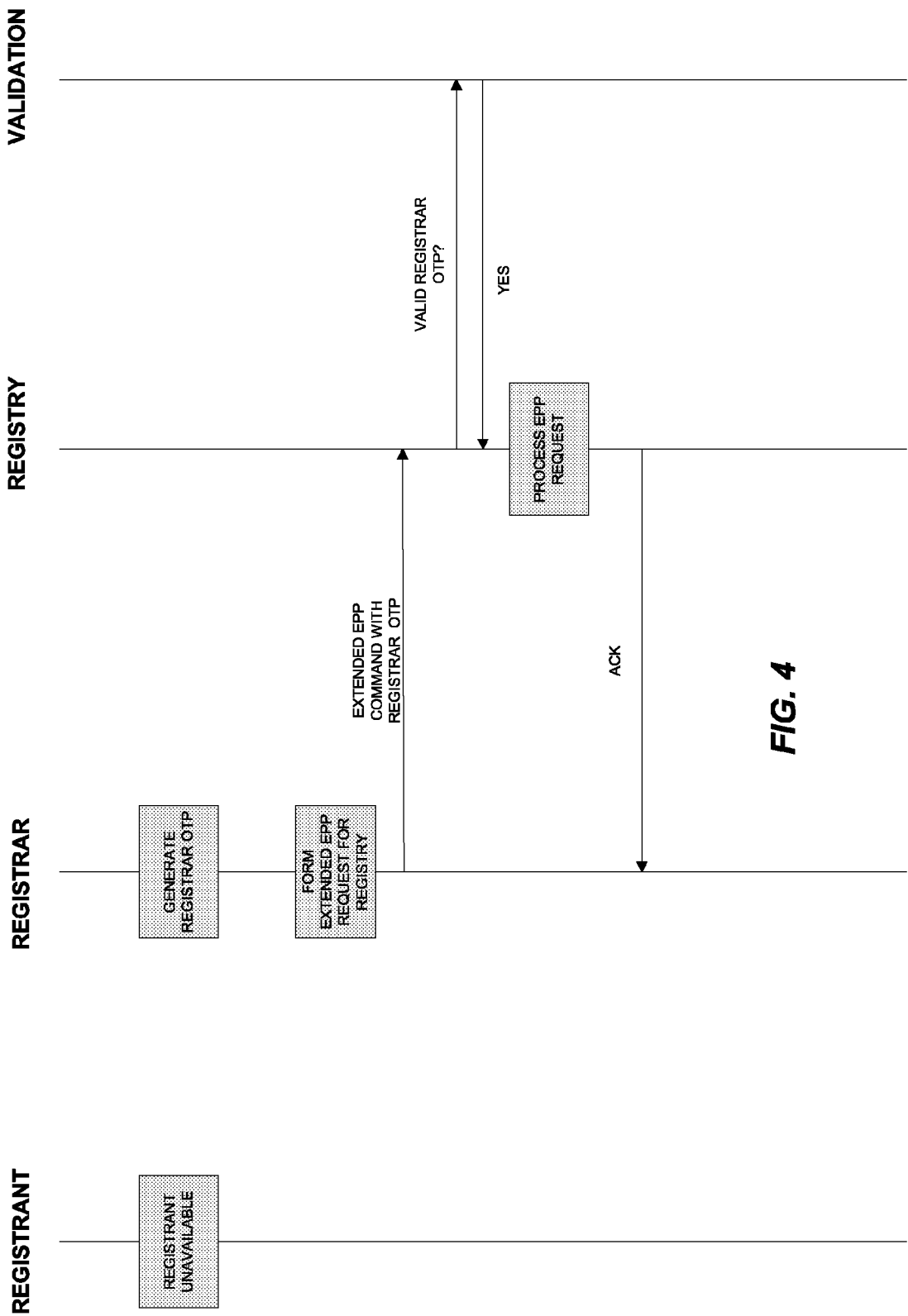
FIG. 4 shows a message flow diagram for registrar-only authentication and authorization in accordance with an embodiment of the present invention.

FIG. 4 shows a message flow in accordance with an embodiment of the present invention in which the registrant is unavailable and the registrar wished to make changes to the domain name record, e.g., to delete the record or remove it from the zone file until payment is received from the present or another registrant. In this case, the registrar generates a OTP and formulates an extended EPP request containing the registrar OTP and sends it to the registry. The registry verifies the registrar OTP by sending it to a validation server. If the validation server indicates that the registrar OTP is verified, then the registry processes the EPP command. If the validation server indicates that the verification has failed, an error message is generated and sent to the registry. The registry can then send an error message to the registrar.

Figure 5:
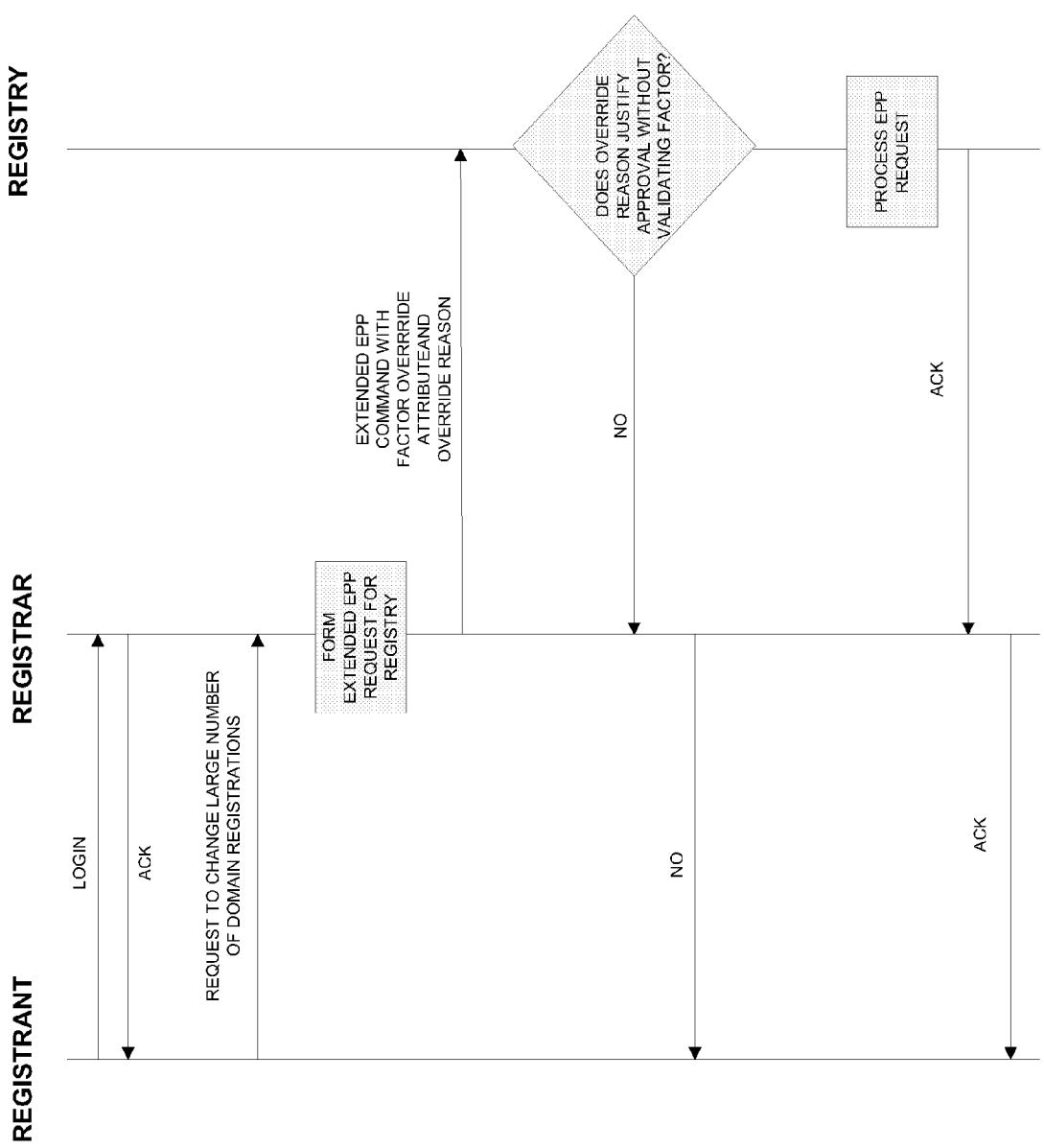
FIG. 5 shows a message flow diagram for authentication/authorization factor override in accordance with an embodiment of the present invention.

FIG. 5 shows a message flow in accordance with an embodiment of the present invention in which an override condition exists (e.g., a requirement to change a large number of domains) and no factor is needed to effectuate the change. In this embodiment, the registrar formulates an extended EPP request that includes an OTP override attribute and an OTP override reason attribute. This extended EPP command can be automatically reviewed or referred to a human operator to review at the registry. If the reviewer determines that the override reason is adequate to justify processing the EPP command without first verifying a factor, then the EPP command is processed. If the reviewer deems the override reason insufficient, the EPP command is not processed and an error message is sent to the registrar.

The factor provided with the EPP command can be verified by the validation server in different ways, in accordance with various embodiments of the present invention. In an embodiment, the token identifier is also included in the extended EPP command sent to the registry. The token identifier is passed along with the OTP to the validation server, which uses the token identifier to look up the shared secret used as the basis for generating the OTP. The validation server can use this shared secret to verify the OTP. In another embodiment, the registrar includes registrant identification information included in, or sent in addition to, the extended EPP command. This registrant identification information (e.g., a registrant user identifier, logon identifier, handle, registrant network address information (e.g., source address information), etc.) can be used by validation server to lookup a registrant reference item (e.g., a token secret, a biometric sample or hash thereof, certificate information, etc.) that can be used to verify the factor.

In yet other embodiments of the present invention, more than one factor may be used to authenticate and authorize a request from a registrant to change a domain name registration record. For example, a registrant may include a OTP and biometric data in a request to a registrar to make the change. The registrar can include both the OTP and the biometric data in an extended EPP command to be sent to the registry. The registry can verify both the OTP and the biometric data before processing the EPP command. Likewise, any suitable combination of factors may be used to provide a chain of trust from the registrant to the registry. Each different factor may be sent to the same or a different validation server than other factors.

The registry can implement any suitable policy for processing EPP commands. For example, a registry can require verification of a single factor to process EPP commands for ordinary domains, but require the verification of more than one factor as a precondition to processing EPP commands for high value or locked domains. The registry can require that more than one party provide a factor that can be verified before processing an EPP command, e.g., the registry can implement a policy of "two man control" or n-person control over a domain.

The present invention is not limited to the use of EPP commands. Any suitable provisioning protocol can benefit from the chain of trust that can be established by implementing embodiments of the present invention. For example, recipients of messages in a publish-subscribe system can authenticate the sender of a message if the sender sends one or more factors along with the message to a relay server for publication. Upon receiving the message, the recipient can send the one or more factors to one or more validation servers for verification. The success or failure of the verification can indicate whether the message is authentic. If the message is actionable, the success of failure of the verification can determine whether or not the message is acted upon by the recipient.

In accordance with embodiments of the present invention, one or more failed attempts to verify a factor can result in actions besides or in addition to not processing the EPP command. For example, repeated failed verifications can be reported as a potential fraud to the registrar, or to a fraud detection and prevention service for further analysis. The velocity (e.g., number of failed attempts per unit time (e.g., n seconds, m minutes, etc.) with which the attempts are made can be reported for a given domain, type of domain, source of requests, registrar, registrant, type of registrant, etc. The reporting can be triggered when the number or frequency of the attempts meets or exceeds a given threshold. Likewise, frequent changes of a token bound to a domain can also be reported, particularly if the number of such changes exceeds a given threshold (e.g., more than five times in a week, etc.) A large number or frequency of attacks may also indicate a denial of service attack, which can be reported and appropriate countermeasures taken. Any suitable action may be taken in response to detecting a security breach, such as locking the registrations for one or more domains, throttling the number of requests that will be processed from a given source, such as a registrar, throttling the number of requests that will be processed that originate from a given factor generator (e.g., token, PKI smart card, biometric reader, etc.) or registrant.

Embodiments of the present invention can validate the factor asynchronously. For example, the registrant can send a request to a registrar to update a domain name record, along with at least one factor such as an OTP, biometric data, PKI data from a smart card, etc. The registrar can send an update command and the factor to the registry. The registry can receive the command and return a success message to the registrar by setting the object (domain) with a pending status, such as pendingUpdate. The registry can then send the at least one factor to one or more validation servers for verification. Based upon the results of the validation, the registry will or will not apply the update to the domain name record and remove the pending status. The registrar can then be notified of the result of the pending request, e.g., via an EPP poll message.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for authentication of a registrant, comprising:
receiving, at a registry server, an extended extensible provisioning protocol (EPP) command from a registrar server, the EPP command including:
 a registrant one-time password generated by the registrant, and
 a registrant identifier;
sending the registrant one-time password and the registrant identifier from the registry server to a validation server;
receiving, at the registry server, a verification message from the validation server; and
processing, at the register server, in response to the verification message that is received from the validation server, the EPP command that is received from the registrar server.

2. The method of claim 1, wherein the EPP command includes at least one of: transfer, create, delete, renew and update.

3. The method of claim 1, wherein the registrant identifier is a token identifier from which one-time passwords can be generated.

4. The method of claim 1, wherein the registrant identifier is based on a registrant user identifier.

5. A method for authentication, of a registrant, comprising:
receiving, at a registry server, a message from a registrar server, wherein the message includes at least one registrant factor that is generated by the registrant;
sending the at least one registrant factor to at least one validation server;
receiving at least one verification message from the at least one validation server; and
processing, at the registry server, in response to the at least one verification message that is received from the at least one validation server, the message that is received from the registrar server.

6. The method of claim 5, wherein the message can include an extensible provisioning protocol (EPP) command.

7. The method of claim 5, wherein the message can be an extended extensible provisioning protocol (EPP) command that includes at least one factor.

8. The method of claim 5, wherein the message can include at least one extensible provisioning protocol (EPP) command from the group of: transfer, create, delete, renew and update.

9. The method of claim 5, wherein the factor includes at least one of: biometric information, a one-time password, public key infrastructure (PKI) information, short message service (SMS) information, automated voice call identification and a device identifier.

10. The method of claim 5, further including: receiving, at the registry, registrant information.

11. The method of claim 10, wherein the registrant information includes at least one of: a registrant token identifier, information based upon a registrant logon identifier, and registrant network address information.

12. The method of claim 5, further comprising:
sending the at least one registrant factor to a second validation server for verification.

13. The method of claim 5, wherein processing the message includes at least one of: transferring a domain name record, creating the domain name record, deleting the domain name record, renewing the domain name record, and updating the domain name record.

14. The method of claim 12, wherein the at least one registrant factor is sent to the second validation server in response to the message comprising an extensible provisioning protocol (EPP) transfer command.

15. The method of claim 5, further comprising:
receiving a registrant factor for messages associated with domain names below a threshold value; and
receiving a plurality of registrant factors for messages above a threshold value.

16. The method of claim 5, wherein the message further comprises an old token identifier, a one-time password associated with the old token identifier, and a new token identifier; and the processing further comprises associating the new token identifier with the registrar.

* * * * *